J. FARRELL.
HOISTING MECHANISM.
APPLICATION FILED SEPT. 28, 1909.
960,298.
Patented June 7, 1910.
Fig. 1.
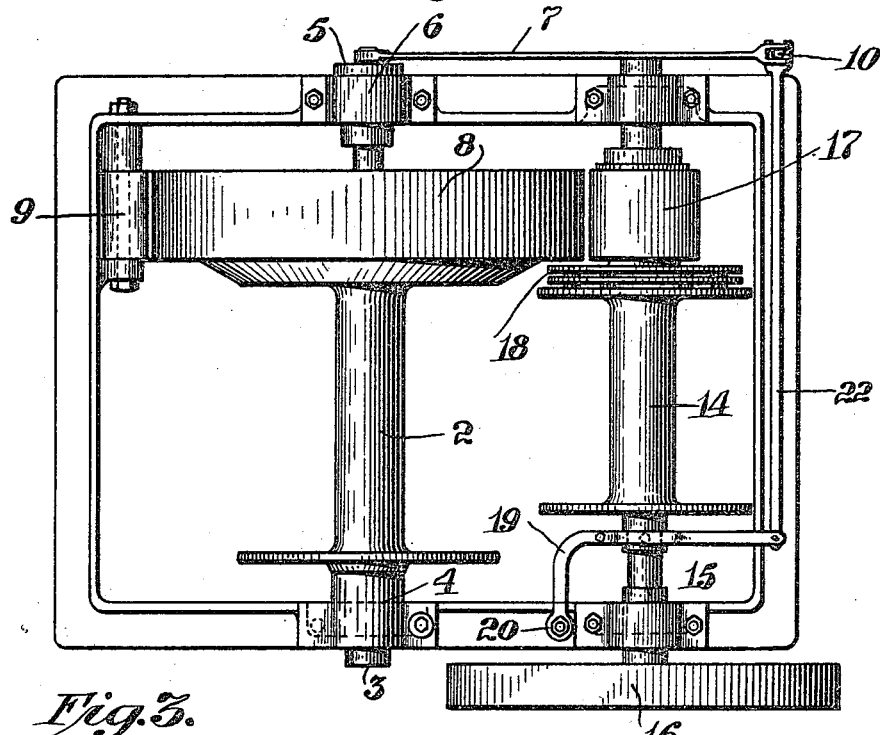
Fig. 3.
Fig. 2.
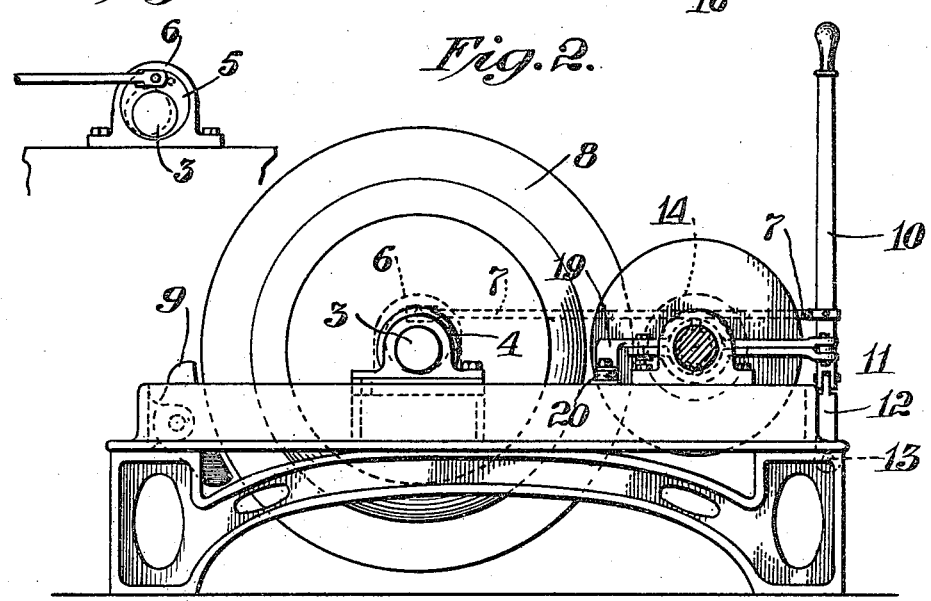
Attest:
Inventor:
John Farrell
by ... his Atty.

UNITED STATES PATENT OFFICE.

JOHN FARRELL, OF NEWTON, NEW JERSEY.

HOISTING MECHANISM.

960,298.           Specification of Letters Patent.      Patented June 7, 1910.

Application filed September 28, 1909. Serial No. 519,995.

*To all whom it may concern:*

Be it known that I, JOHN FARRELL, a citizen of the United States, and resident of Newton, in the county of Sussex and State of New Jersey, have invented certain new and useful Improvements in Hoisting Mechanism, of which the following is a specification.

This invention relates to improvements in hoisting mechanism, and especially to those used for operating hay forks such as are used for gripping hay and carrying it to where it is to be automatically released from the fork and the fork then returned to the hoisting mechanism or for similar or other purposes.

The object of my invention is to provide a new and improved hoisting mechanism of this kind which is simple in construction, strong and durable, composed of few parts and requires but a single lever for controlling the hoisting rope and the rope for returning the carrier.

In the accompanying drawings in which like letters of reference indicate like parts in all the figures: Figure 1 is a plan view of my improved hoisting mechanism. Fig. 2 is a side elevation. Fig. 3 is a detail view showing the eccentric.

The entire mechanism is mounted on a suitable frame 1. The drum 2 for the hoisting rope is of conventional construction and is fixed on a shaft 3 journaled at one end in a bearing 4 pivoted on the top of the frame 1 in such a manner that it can swing slightly in the plane of the top of the frame. The other end of the shaft 3 is mounted in the cam or eccentric 5 mounted in a bearing 6 fixed on the frame 1, and serves for slightly swinging the shaft and drum in the plane of the main frame 1. A friction pulley 8 is secured on the shaft 3 and at one side of this pulley a brake shoe 9 is mounted on the frame 1. The eccentric 5 is connected by a connecting rod 7 with a lever 10, which is pivoted at 11 to a block or clip 12 pivoted at 13 to the side of the frame 1, so that the lever 10 can be swung on the pivot 11 in a vertical plane substantially parallel with that through the axis of the main drum and the lever with its clip or block 12 can be swung on the pivot 13 in a substantially vertical plane substantially at right angles to the vertical plane through the center of the main drum.

The drum 14 for the return rope which is of much smaller dimensions than the hoisting rope, is mounted loosely on a shaft 15 in such a manner that it can rotate and can be moved in the direction of its length. This shaft 15 carries a pulley 16 which is driven from some suitable source of power, such as an electric motor, gas engine, or the like. On this shaft 15 there is mounted a friction pulley 17, in line with the friction pulley 8 on the shaft of the main drum 2. At that end of the small drum 14 adjacent to the friction pulley 17 a friction face is formed in some suitable manner, for example, by superimposed layers of paper or the like as shown at 18 which can come into contact with the adjacent end of the small friction pulley 17. A lever 19 is pivoted on the frame 1 at 20 to swing horizontally and in it a neck on one end of the small pulley 14 is mounted to turn and the free end of this lever 19 is connected by a rod 22 with the lever 10.

When the load is to be hoisted the lever 10 is moved in the direction from the main drum substantially parallel to the side of the frame 1 whereby the larger friction pulley 8 is brought into contact with the small friction pulley 17 causing the latter to rotate the larger friction pulley and the main hoisting drum 2. When the load is to be held at any certain point the lever 10 is moved in the reverse direction so as to bring the large friction pulley 8 in contact with the brake shoe 9 on the frame. When the load is to descend, the lever 10 is moved in the direction parallel with the side of the frame 1 sufficiently to hold the larger friction pulley 8 out of engagement with the smaller friction pulley 17 and also out of engagement with the fixed brake shoe.

When the smaller rope for returning the carrying device is to be wound on its drum 14 the lever 10 is moved in a substantially vertical plane parallel with the front of the frame 1 so as to press the end of the smaller drum 14 against the adjacent end of the small friction pulley 17 or if the smaller drum is provided with a friction head on its end, to press this friction head against the adjacent end of the small pulley so that the smaller drum is rotated and winds up the return rope. When this rope has been wound up as much as necessary the lever 10 is moved in the reverse direction in a substantially vertical plane parallel with the front of the frame 1 and the smaller hoisting drum is now entirely free. It will thus be seen that a single handle lever serves for applying power to either drum and for braking the main drum.

Having described my invention what I claim as new and desire to secure by Letters Patent is:

1. In a hoisting mechanism, the combination with a frame, of a driven shaft therein, a friction pulley on said shaft, a rope drum mounted loosely on the shaft, carrying the friction pulley, an additional rope drum mounted pivotally on the frame, a friction wheel mounted on the pivoted rope drum, opposite the friction pulley on the driven shaft, a brake-shoe fixed on the frame in alinement with the friction pulley on the pivoted shaft and diametrically opposite the friction pulley on the driven shaft and a single lever for engaging either drum with the friction pulley and holding one drum by contact with the fixed brake-shoe, substantially as set forth.

2. In a hoisting mechanism, the combination with a frame and a driven shaft mounted therein, a friction pulley fixed on the driven shaft, a rope drum mounted loosely on said driven shaft, to turn and slide thereon, means for holding one end of said drum in contact with one end of the friction pulley, an additional independent rope drum mounted in the frame, a friction pulley connected therewith, a handle lever and means connected with the handle lever for bringing the periphery of the friction pulley on the rope drum in contact with the periphery of the friction pulley on the driven shaft and means connecting said lever with the means for bringing the drum on the driven shaft in contact with one end of the friction pulley on said shaft, substantially as set forth.

3. In a hoisting mechanism, the combination with a frame and a driven shaft mounted therein, of a friction pulley on the driven shaft, a drum mounted loosely on said shaft to turn and to slide thereon, means for pressing one end of the drum against one end of the friction pulley, an independent drum mounted on the frame, a friction pulley connected therewith, a brake shoe on the frame a handle lever pivoted on the frame, means connected with the said lever and the drum having a friction pulley for moving the friction wheel on the drum into contact with the friction pulley on the driven shaft or in contact with the brake shoe and means connected with the handle lever, for operating the means for shifting the drum on the driven shaft, substantially as set forth.

4. In a hoisting mechanism, the combination with a frame and a driven shaft therein, of a friction pulley fixed on said shaft, two independent rope drums mounted in the frame, one of the rope drums being mounted to slide lengthwise toward and from the pulley and the other pivoted to swing toward and from the periphery of the friction pulley, a lever pivoted on the frame and means connected with the lever for moving one drum lengthwise and for swinging the other drum on its pivot, substantially as set forth.

Signed at Newton in the county of Sussex and State of New Jersey this day of September A. D. 1909.

JOHN FARRELL.

Witnesses:
JENNIE M. GREER,
HENRY J. WOODWARD.